Figure 1:
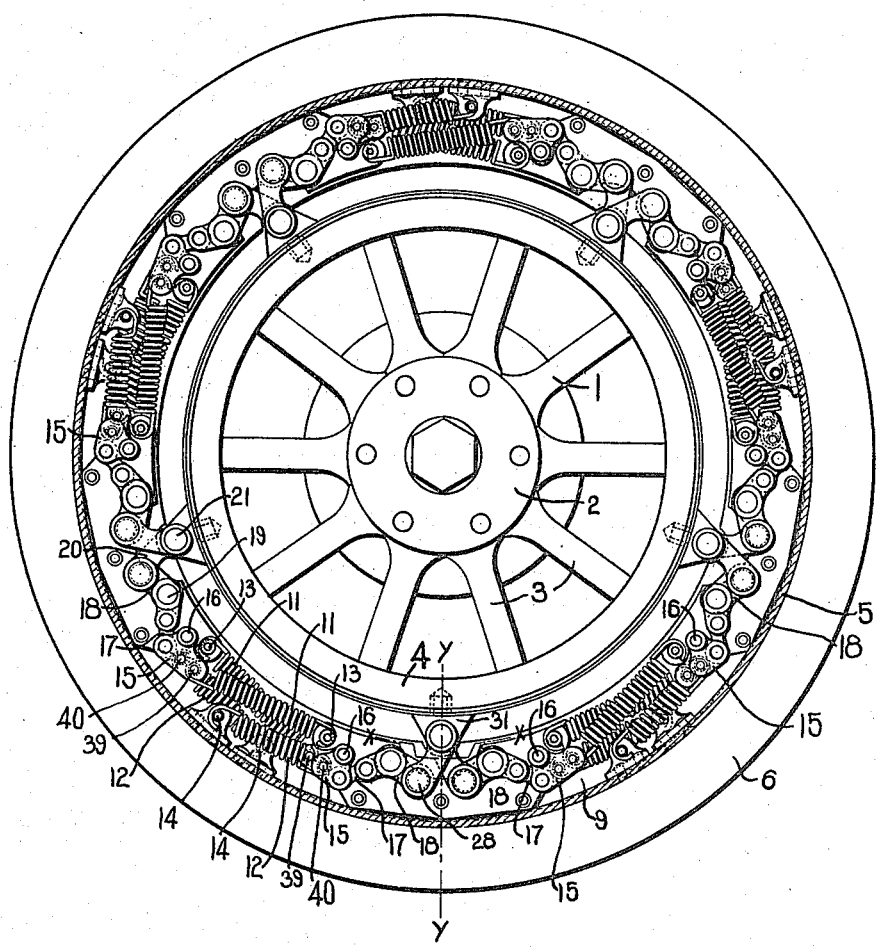

J. A. STAHLE.
RESILIENT WHEEL.
APPLICATION FILED APR. 2, 1914.

1,165,726.

Patented Dec. 28, 1915.
3 SHEETS—SHEET 1.

Witnesses.

Inventor.
John A. Stahle
by Heard Smith & Tennant
Att'y's

J. A. STAHLE.
RESILIENT WHEEL.
APPLICATION FILED APR. 2, 1914.

1,165,726.

Patented Dec. 28, 1915.
3 SHEETS—SHEET 2.

Witnesses.
J. Morrill Fuller
William E. Gagen

Inventor.
John A. Stahle
by Heard Smith & Tennant
Att'y's

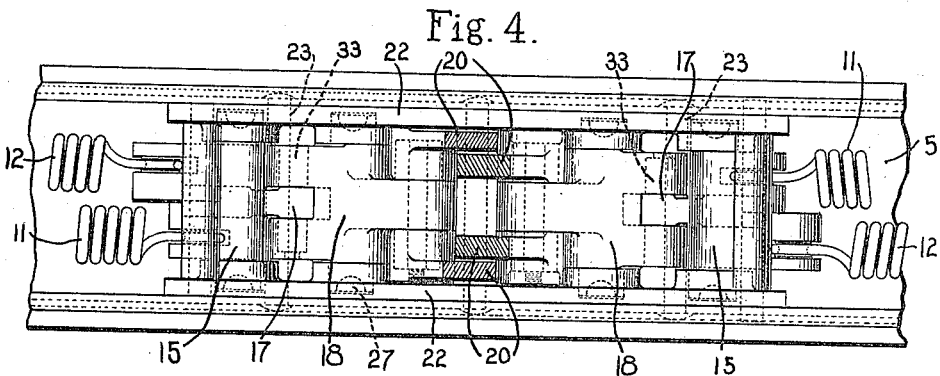
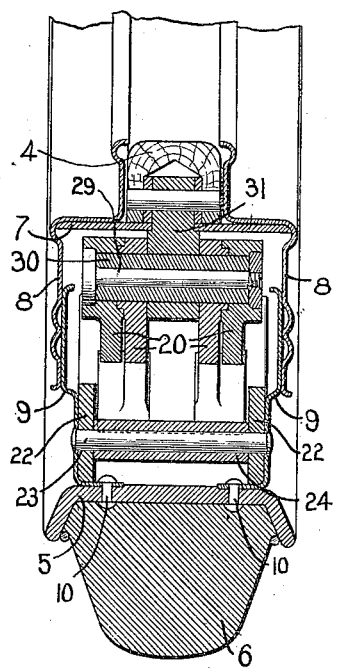
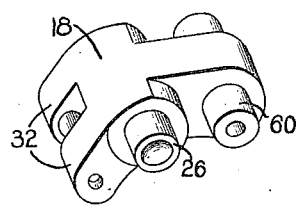
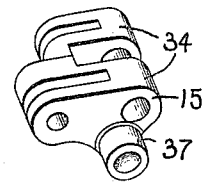
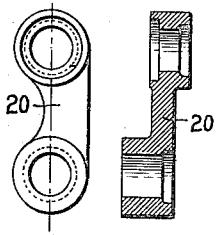
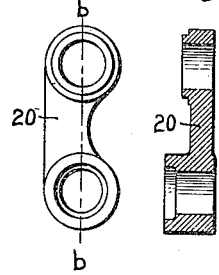
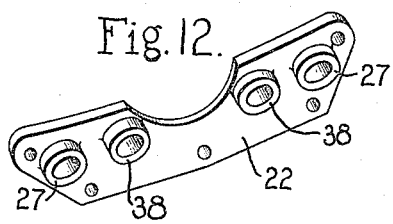

UNITED STATES PATENT OFFICE.

JOHN A. STAHLE, OF BOSTON, MASSACHUSETTS, ASSIGNOR TO STAHLE MECHANICAL TIRE COMPANY, LTD., OF BOSTON, MASSACHUSETTS, A CORPORATION OF MAINE.

RESILIENT WHEEL.

1,165,726.  Specification of Letters Patent.  Patented Dec. 28, 1915.

Application filed April 2, 1914. Serial No. 828,987.

*To all whom it may concern:*

Be it known that I, JOHN A. STAHLE, a citizen of the United States, residing at Boston, county of Suffolk, State of Massachusetts, have invented an Improvement in Resilient Wheels, of which the following description, in connection with the accompanying drawing, is a specification, like characters on the drawing representing like parts.

This invention relates to resilient wheels of that class involving a wheel body, an outer rim encircling the wheel body and resilient means situated between the wheel body and rim and operating to give the desired resiliency to the wheel.

The object of the present invention is to provide a novel form of resilient connection between the wheel body and the rim which will give the proper resiliency to the wheel whether the latter is heavily or lightly loaded and which has such a construction that it will not become injured in use and is not liable to breakage.

I will first describe a selected embodiment of my invention and then point out the novel features in the appended claims.

Figure 2:
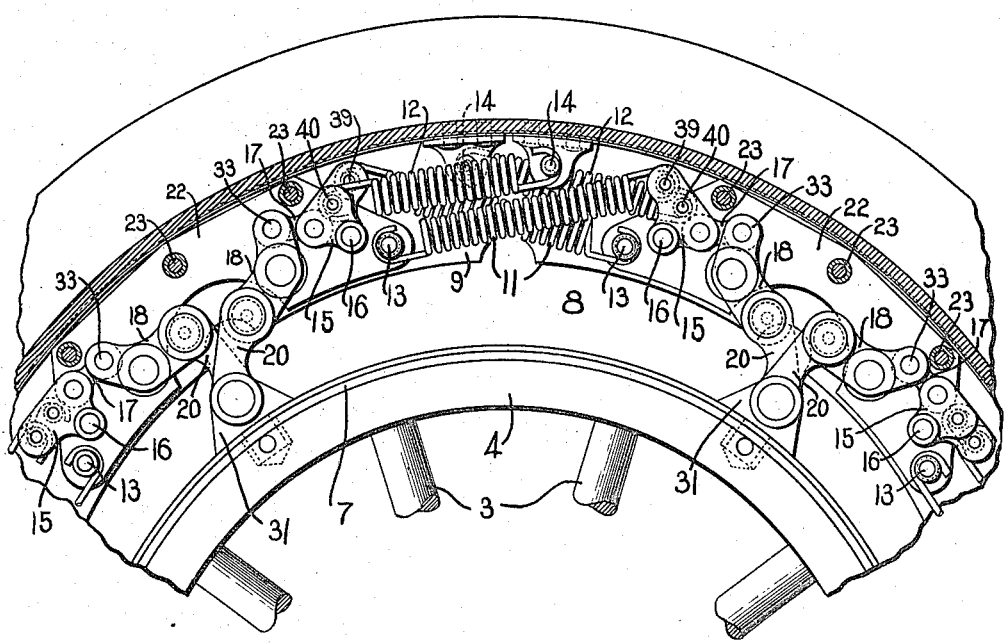
Figure 3:
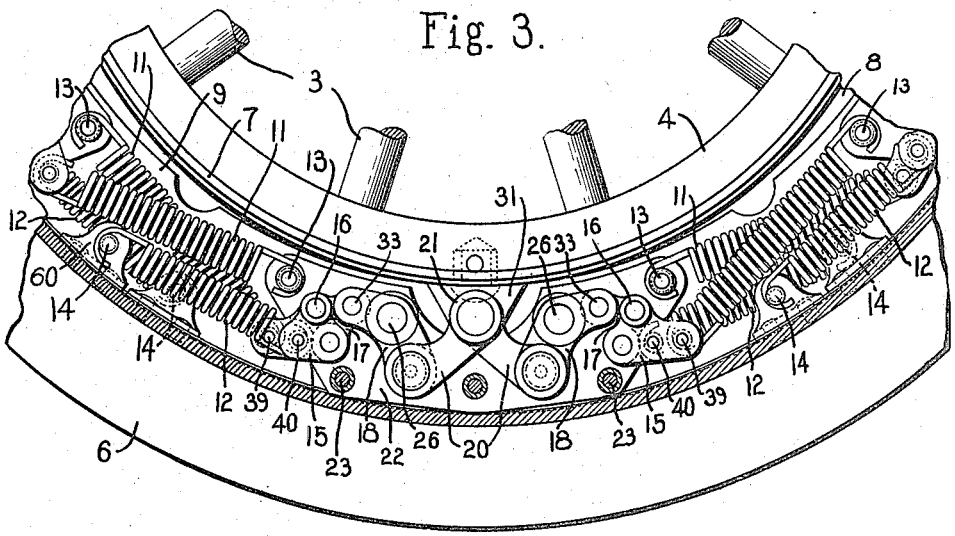

Referring now to the drawings, Figure 1 is a vertical sectional view through a wheel embodying my invention; Fig. 2 is an enlarged fragmentary sectional view showing the position of the resilient load-supporting means at the top of the wheel when the latter is loaded; Fig. 3 is a similar view showing the position of the load-supporting means at the bottom of the wheel when the latter is loaded; Fig. 4 is an enlarged section on the line $x$—$x$, Fig. 1; Fig. 5 is an enlarged section on the line $y$—$y$, Fig. 1; Fig. 6 is a perspective view of the lever 18; Fig. 7 is a perspective view of the rocking member 15 to which the springs are attached; Fig. 8 is a side view of one of the links 20; Fig. 9 is a section on the line $a$—$a$, Fig. 8; Fig. 10 is a side view of the other link 20; Fig. 11 is a section on the line $b$—$b$, Fig. 10; Fig. 12 is a perspective view of one of the side plates 22 to which the levers are secured.

My wheel comprises the wheel body 1, an exterior rim 5 encircling the wheel body, and novel resilient load-supporting means interposed between the rim and the wheel body. The wheel body may have any suitable or usual construction, and is herein shown as provided with the hub 2, spokes 3 and rim portion 4. The exterior rim 5 is preferably a rigid structure encircling the wheel body and it is provided with any suitable tread member 6, preferably a solid rubber tread member. The rim of the wheel body is shown as encircled by a metal band 7 and as provided with the two side plates or flanges 8 that are secured to the wheel body in any suitable way. These flanges 8 extend outwardly from the wheel body and overlap other flanges 9 that extend inwardly from the exterior rim 5, said flanges forming between them the space in which the load-supporting members are received, this being a construction which is more or less common to resilient wheels of this type. The flanges 9 are shown as made of sheet metal pressed into shape and may be secured to the exterior rim 5 in any suitable way as by means of rivets 10. My improved resilient load-supporting means comprises a plurality of contracting spiral springs anchored at one end either to the exterior rim or the wheel body, and a toggle lever connection between the other end of said springs and the other part of the wheel. In the embodiment herein shown the springs are anchored at one end to the exterior rim and the toggle lever connection is between the other end of said springs and the wheel body.

In the present embodiment of the invention the springs are in the nature of contracting spiral springs and are arranged in sets of two, but this is not an essential arrangement as will be presently understood. The two springs of each set are shown at 11 and 12, and these are anchored to the exterior rim at 13 and 14, respectively. The other ends of the two springs of each set are connected to a rocking member 15 which is pivoted at 16 to the exterior wheel rim, and this member is pivotally connected by a link 17 to a lever 18 that is also pivoted to the exterior rim, said lever 18 being connected by a link or connection 20 with the wheel body.

I will employ as many sets of springs as desirable to properly support the load, and preferably the sets of springs with their connections will be arranged in pairs with the devices of each pair oppositely disposed, as shown in Fig. 1, so that the wheel will operate equally well while running in either direction. In the construction herein shown the levers 18 and rocking members 15 of each set are pivotally sustained in supporting plates 22 situated between the flanges 9, these plates preferably being secured in place by means of rivets 23 extending through said plates and through the flanges 9, as seen in Fig. 4. A spacing sleeve 24 is shown as situated between the supporting pieces 22 to hold them properly spaced. The members 15 and levers 18 may be pivotally sustained in the side pieces 22 by any suitable construction which will permit them to rock. As herein shown the lever 18 is provided with the hubs or trunnions 26 that are supported in bearings 27 secured to or formed on the side pieces 22. One end of the member 18 is provided with trunnions 60 on which the links 20 (there being two links 20 for each member 18) are pivotally mounted. The inner ends of the links 20 are pivotally mounted on a pivotal pin 30 secured in a block or support 31 that is fastened to the rim of the wheel body, and the links are held in position on said pin 30 by a bolt 29. The outer end of each lever 18 is forked, as at 32, and the link 17 is pivotally connected between the arms of the forked end by means of a pivotal pin 33. The end of the link 17 is received in the forked portions 34 of the rocking member 15, said link and rocking member being pivotally connected together by the pivotal pin 16. The rocking member 15 is supported in the supporting plates 22 in substantially the same manner as the lever 18 is, that is, said member is provided with hubs 37 that enter bearings 38 extending from the side pieces 22. This member 15 is provided with pins 39, 40, to which the springs 11 and 12 are connected.

As stated above there is a similar series of levers and connections for each of the sets of springs 11 and 12, and by arranging the adjacent series of springs reversely, as herein shown, the same side plates 22 can be used for supporting two sets of levers 18 and members 15 and the links 20 for each set can be pivotally connected by the same pin 30 to the same block 31 on the wheel body.

The construction of the parts is such that under normal conditions when the wheel is not loaded, the connections assume the position shown in Fig. 1, that is, the links 17 stand in line with the forked end 32 of the lever 18 and the pivotal connections between the member 15 and link 17, and between the said link 17 and lever 18, are in line with the pivotal axis of said member 18. A swinging movement of the lever 18 in either direction from this central or neutral position will, therefore, rock the member 15 about its pivot and thus stretch the springs connected thereto. The connection between the lever 18 and the wheel body is such that said lever is rocked in one direction or the other whenever the wheel is loaded and regardless of the position in the wheel in which the lever is located, that is, this same action will take place whether the lever happens to be on the underside of the wheel or on the upper side of the wheel, or in any position between these two locations. Hence all of the springs throughout the wheel come into play simultaneously to help support the load whenever the wheel is loaded. When the wheel is loaded the wheel body will move downwardly relative to the exterior rim and the levers 18 at the lower side of the wheel are turned about their pivotal points by a thrust conveyed through the links 20 into the position shown in Fig. 3, and during this rocking movement of the levers 18 they act on the members 15 through the links 17 thereby to stretch the springs 11 and 12. At the upper side of the wheel the movement of the wheel body is away from the rim and the links 20 will, therefore, exert a pull upon the levers 18, thus turning them in the opposite direction from what the levers at the lower side of the wheel are turned, but nevertheless because of the construction shown such turning movement of the levers 18 operates through the links 17 to turn the members 15 and thereby stretch or increase the tension of the springs at the upper side of the wheel. Similarly, the springs at the intermediate points will be placed under more or less tension whenever the wheel is loaded, as will be obvious from an inspection of Fig. 1. All of the springs are, therefore, at all times in use for supporting the load, and no springs are employed in the wheel construction which are idle or inactive part of the time. By this means it is possible to reduce greatly the weight of the wheel and also to use smaller springs. The springs may be anchored to the exterior rim in any approved way. As herein shown the springs 11 are anchored to pins 13 which are carried by the side pieces 22 while the springs 12 are connected to pins 14 secured to blocks or anchoring members 60 attached to the exterior rim 5.

One advantage of the construction herein shown lies in the fact that the leverage increases as the load increases.

One of the important features of the invention resides in the construction involving the rocking member 18, link 17 and member 15 by which when the springs are normal or at rest the link 17 is in line with the forked end 32 of the member 18, as shown in Fig. 1, so that the member 15 will be turned to stretch the springs 11 and 12 whichever way the rocking member 18 is moved. Normally the parts are on a sort of dead center and the strain of the springs 11 and 12 transmitted through the parts 15 comes directly on the pivotal support for the member 18, but when said member is turned in either direction, as shown in either Fig. 2 or 3, then the springs 11 or 12 will be put under increased tension.

While I have illustrated herein a preferred embodiment of my invention, I do not wish to be limited to the constructional features shown.

Having described my invention, what I claim as new and desire to secure by Letters Patent is:—

1. In a resilient wheel, the combination with a wheel body, of an exterior rim encircling said body, a plurality of contracting spiral springs anchored at one end to one of said parts, and a normally-straightened toggle lever connection between the other end of said springs and the other part.

2. In a resilient wheel, the combination with a wheel body, of an exterior rim encircling said body, a plurality of contracting spiral springs anchored at one end to said rim, and a normally straightened toggle lever connection between the other ends of said springs and the wheel body.

3. In a resilient wheel, the combination with a wheel body, of an exterior rim encircling said body, a plurality of contracting spiral springs anchored at one end to said rim, rocking members pivoted to the rim and to which the other ends of said springs are connected, a lever for each rocking member also pivoted to the rim, links connecting said levers and rocking members, and connections between said levers and the wheel body.

4. In a resilient wheel, the combination with a wheel body, of an exterior rim encircling said body, a plurality of contracting spiral springs anchored at one end to said rim, rocking members pivoted to the rim and to which the other ends of said springs are connected, a lever for each rocking member also pivoted to the rim, means connecting each lever to its rocking member by which said member is moved against the action of its spring upon turning movement of the lever in either direction, and connections between said levers and the wheel body.

5. In a resilient wheel, the combination with a wheel body, of an exterior rim encircling said body, a plurality of contracting spiral springs anchored at one end to said rim, rocking members pivoted to the rim and to which the other ends of said springs are connected, levers, one for each rocking member also pivoted to the rim, links connecting said levers and rocking members, and connections between said levers and the wheel body, said springs normally holding said levers and link connection with the corresponding rocking members so that the pivotal axis of each lever is in line with the points of connection between each link and the lever and rocking member.

6. In a resilient wheel, the combination with a wheel body, of an exterior rim, a plurality of pairs of supporting side pieces secured to the rim, levers and rocking members pivoted to each pair of side pieces, a link connecting each lever to the corresponding rocking member, connections between each lever and the wheel body, and contracting spiral springs connected at one end to the rocking members and at the other end to the rim.

7. In a resilient wheel, the combination with a wheel body, of an exterior rim encircling the wheel body, a plurality of levers, each pivoted centrally thereof to the rim, a link connecting one end of each lever to the wheel body, a rocking member connected to the other end of each lever, and springs resisting the rocking movement of the rocking members in one direction.

8. In a resilient wheel, the combination with a wheel body, of an exterior rim encircling the wheel body, a plurality of levers each pivoted centrally thereof to the rim, a link connecting one end of each lever to the wheel body, a rocking member connected to the other end of each lever, and springs resisting the turning movement of said rocking members, the connection between each rocking member and lever being such as to cause the springs to be placed under increased tension when the lever turns in either direction from its neutral position.

9. In a resilient wheel, the combination with a wheel body, of an exterior rim encircling said body, a plurality of levers, each pivoted to said rim intermediate of its ends, means connecting said levers to the wheel body, a rocking member for each lever pivoted to the rim, a spring acting on each rocking member to resist turning movement thereof in one direction, and a link connecting each rocking member to its lever.

In testimony whereof, I have signed my name to this specification, in the presence of two subscribing witnesses.

JOHN A. STAHLE.

Witnesses:
    LOUIS C. SMITH,
    THOMAS J. DRUMMOND.

Copies of this patent may be obtained for five cents each, by addressing the "Commissioner of Patents, Washington, D. C."